United States Patent
Yanagi et al.

(10) Patent No.: US 8,058,980 B2
(45) Date of Patent: Nov. 15, 2011

(54) VEHICLE PERIPHERY MONITORING APPARATUS AND IMAGE DISPLAYING METHOD

(75) Inventors: Takura Yanagi, Yokohama (JP); Satoshi Chinomi, Isehara (JP); Takeshi Akatsuka, Yokohama (JP); Tsutomu Kawano, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 504 days.

(21) Appl. No.: 12/202,710

(22) Filed: Sep. 2, 2008

(65) Prior Publication Data

US 2009/0079553 A1    Mar. 26, 2009

(30) Foreign Application Priority Data

Sep. 26, 2007   (JP) ................... 2007-249476

(51) Int. Cl.
  *B60Q 1/00*   (2006.01)
  *G08G 1/017*  (2006.01)
  *G06K 9/00*   (2006.01)
  *B60R 22/00*  (2006.01)

(52) U.S. Cl. ........ 340/435; 340/436; 340/937; 340/903; 382/104; 382/293; 701/45

(58) Field of Classification Search .................. None
See application file for complete search history.

(56) References Cited

U.S. PATENT DOCUMENTS

| | | | | |
|---|---|---|---|---|
| 5,680,123 A * | 10/1997 | Lee | ............... | 340/937 |
| 6,737,964 B2 * | 5/2004 | Samman et al. | ............... | 340/436 |
| 7,161,616 B1 * | 1/2007 | Okamoto et al. | ............ | 348/148 |
| 7,486,801 B2 * | 2/2009 | Suzuki et al. | ................ | 382/103 |
| 7,634,341 B2 * | 12/2009 | Patchell | ......................... | 701/45 |
| 2002/0005778 A1 * | 1/2002 | Breed et al. | .................. | 340/435 |
| 2004/0184638 A1 * | 9/2004 | Nobori et al. | ................. | 382/104 |
| 2007/0053551 A1 | 3/2007 | Kubo et al. | | |
| 2007/0165108 A1 | 7/2007 | Yuasa et al. | | |
| 2009/0058677 A1 * | 3/2009 | Tseng et al. | ................. | 340/904 |

FOREIGN PATENT DOCUMENTS

DE  103 43 866 A1   4/2005
JP  2003-081014 A   3/2003

* cited by examiner

*Primary Examiner* — Jennifer Mehmood
*Assistant Examiner* — Fekadeselassie Girma
(74) *Attorney, Agent, or Firm* — Global IP Counselors, LLP

(57) ABSTRACT

A vehicle periphery monitoring apparatus includes an image capturing device, a display device, a blind spot determining section, and a processing section. The image capturing device is arranged to capture an image of a region rearward of a host vehicle and an image of a region laterally rearward of the host vehicle. The processing section is configured to switch a displayed image on the display device from a first display image to a second display image upon determination of a following vehicle created blind spot region by the blind spot determining section. The first display image includes the image of the region rearward of the host vehicle, and the second display image includes at least a portion of the image of the region laterally rearward of the host vehicle that encompasses the following vehicle created blind spot region which is absent from the first display image.

16 Claims, 13 Drawing Sheets

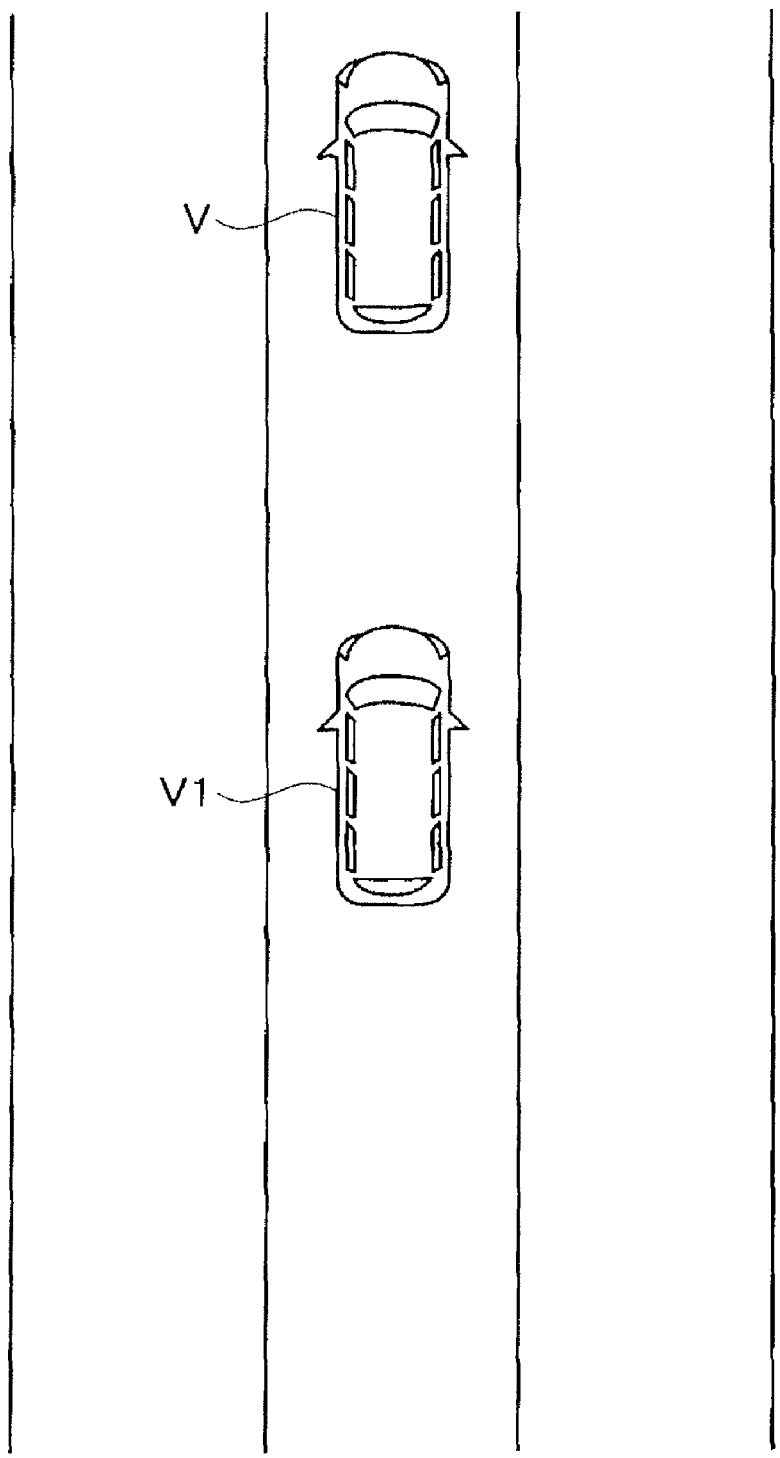
F I G. 3

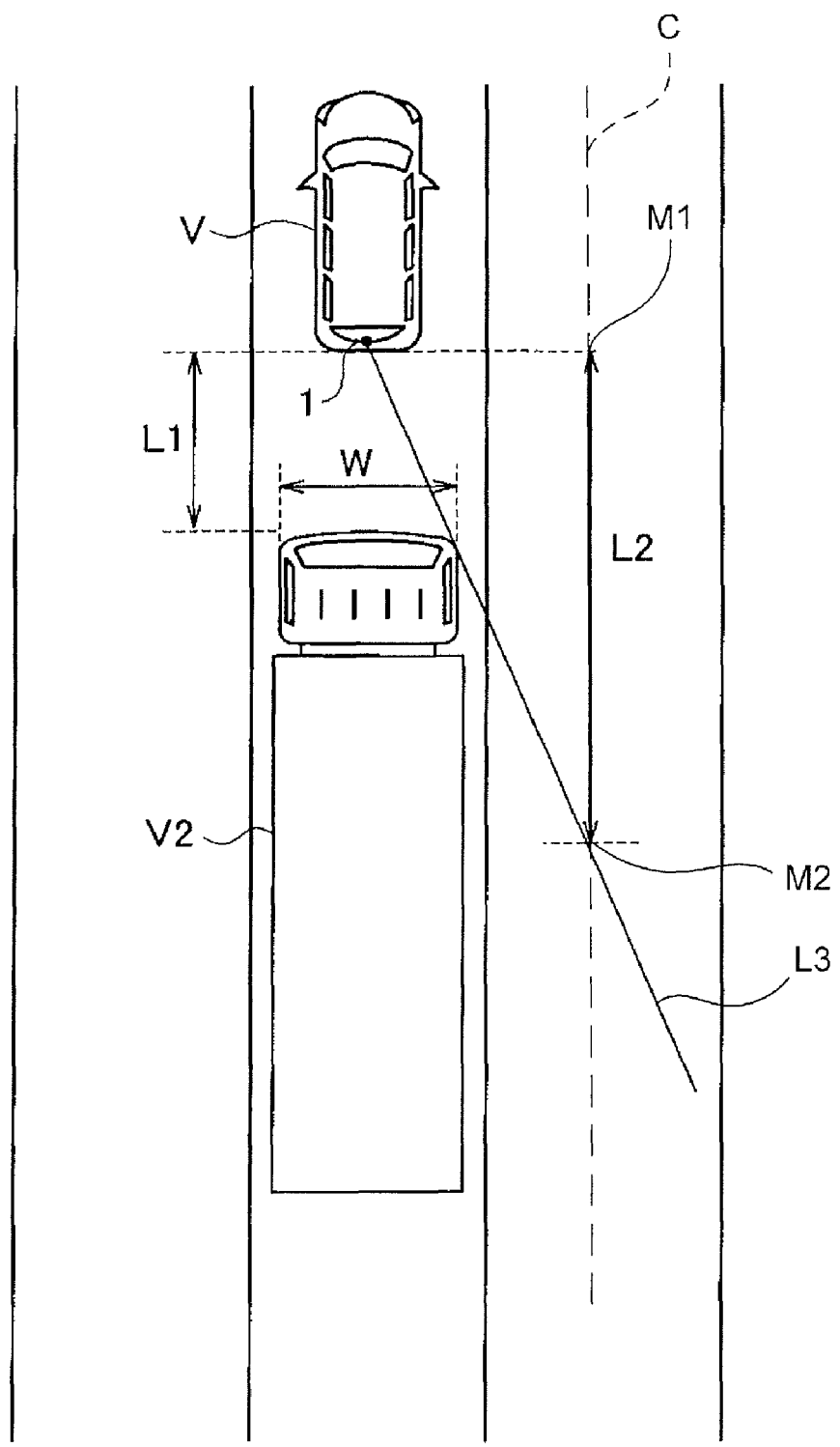
F I G. 13

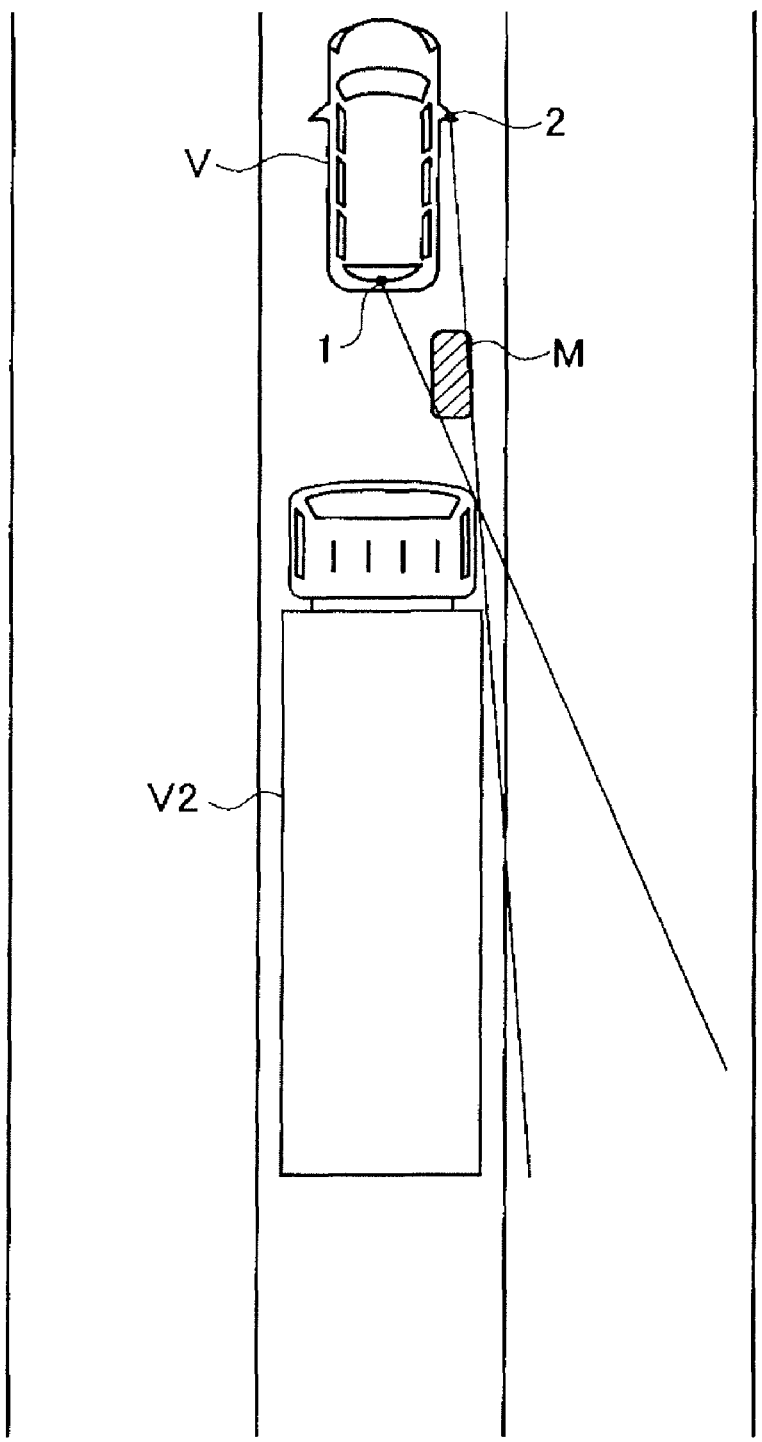
F I G. 14

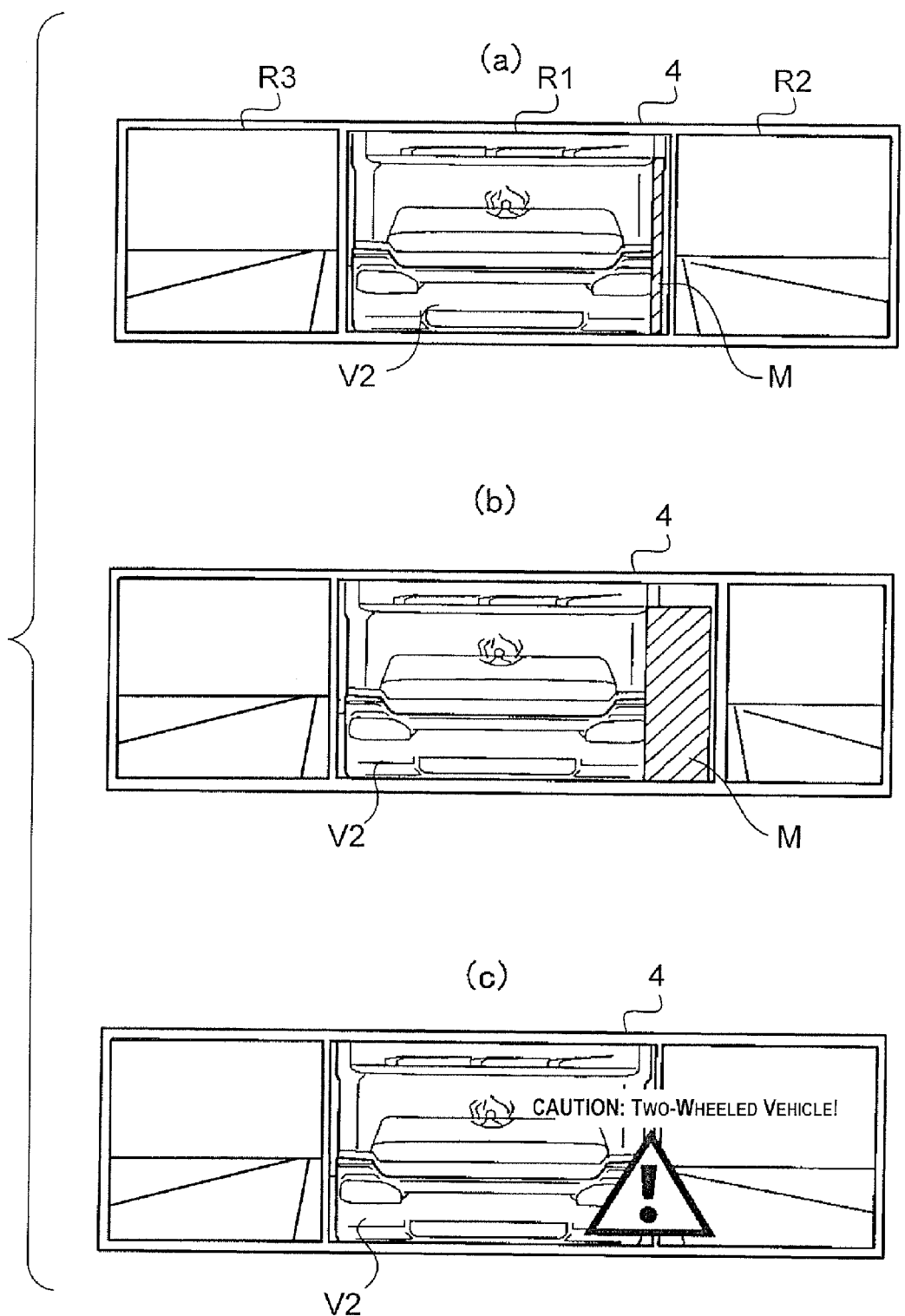
F I G. 15

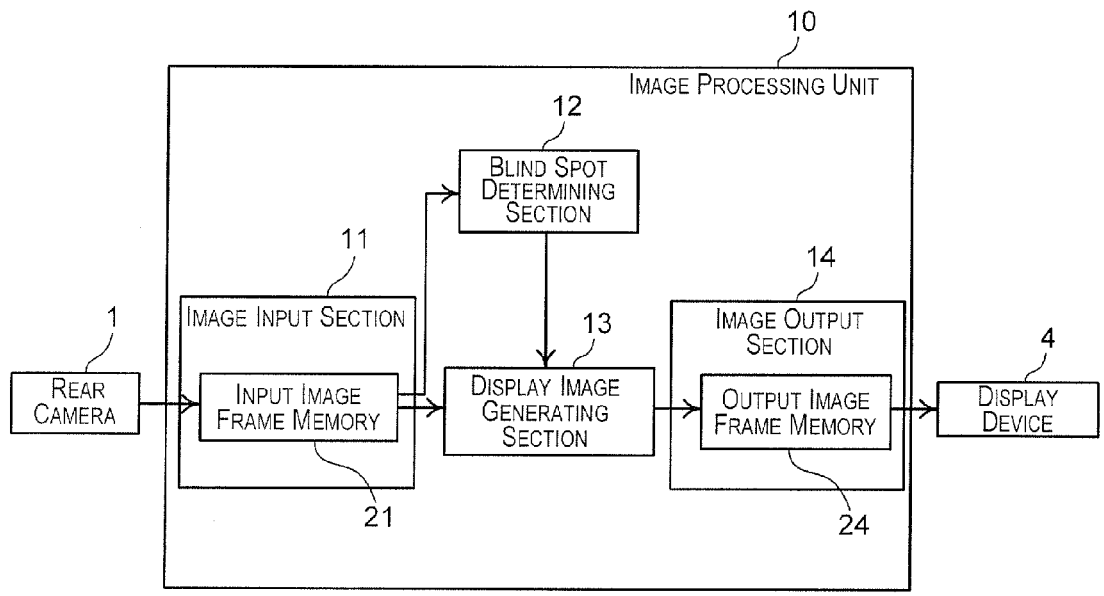
F I G. 16
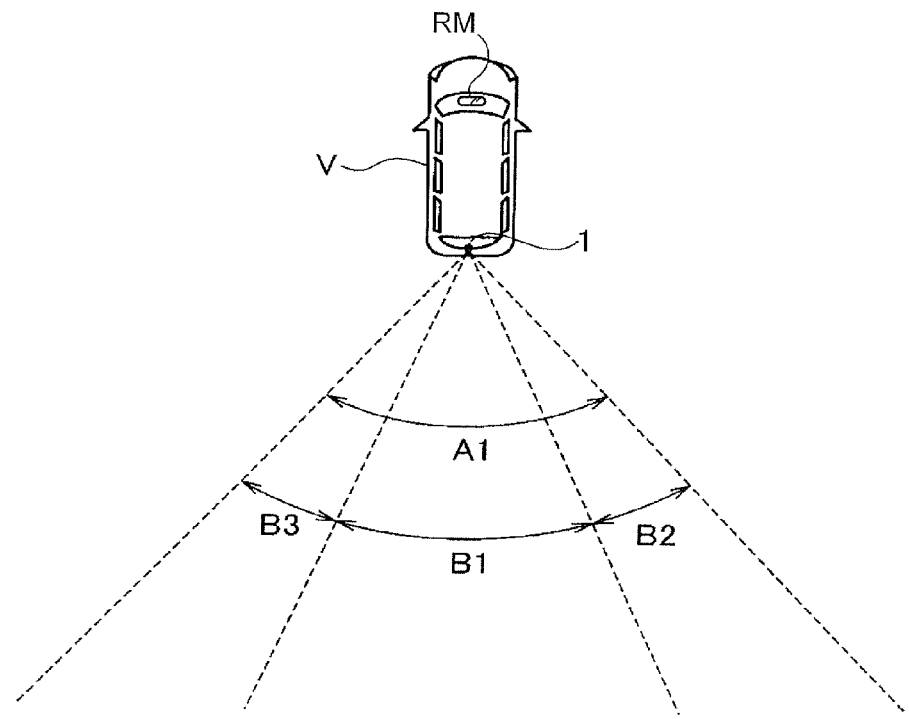
F I G. 17

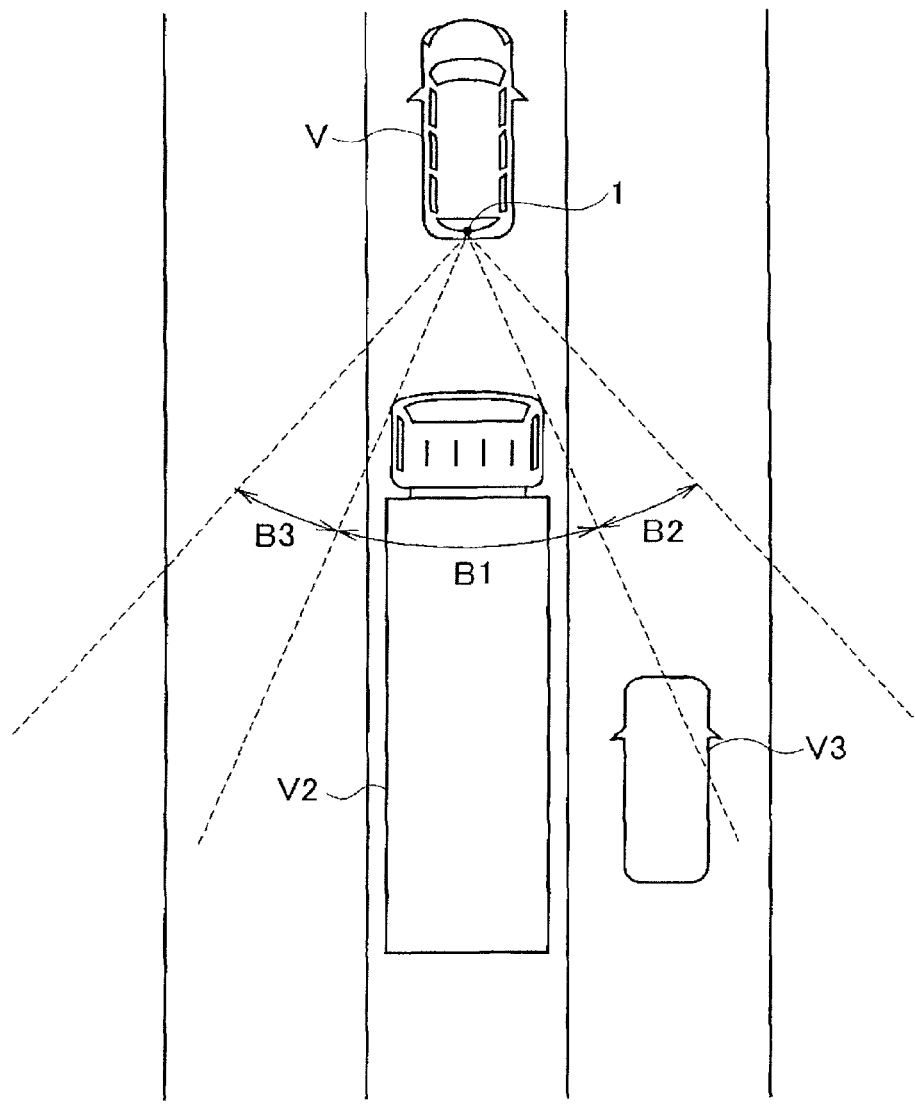
F I G. 18
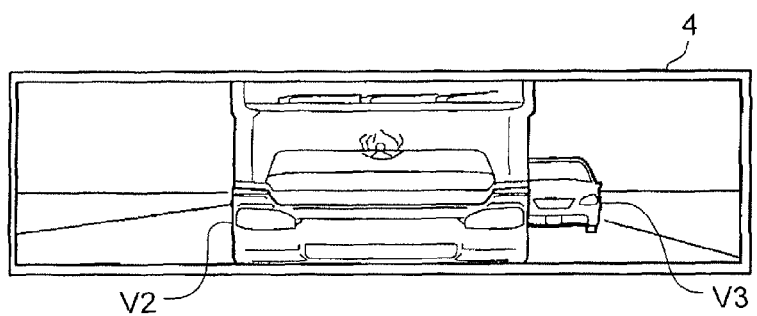
F I G. 19

VEHICLE PERIPHERY MONITORING APPARATUS AND IMAGE DISPLAYING METHOD

CROSS-REFERENCE TO RELATED APPLICATIONS

This application claims priority to Japanese Patent Application No. 2007-249476, filed on Sep. 26, 2007. The entire disclosure of Japanese Patent Application No. 2007-249476 is hereby incorporated herein by reference.

BACKGROUND OF THE INVENTION

1. Field of the Invention

The present invention relates to a vehicle periphery monitoring apparatus and an image displaying method for presenting an image of a region rearward of a vehicle and a region laterally rearward of the vehicle to a driver.

2. Background Information

In conventional technology, an onboard (vehicle-mounted) camera has been used to photograph an image of a region rearward of a vehicle and a region laterally rearward of the vehicle. The image is then displayed on a display device installed inside the vehicle so that a driver can accurately ascertain a situation in the regions directly rearward and laterally rearward of the vehicle. This is accomplished with a small amount of change in a viewing direction while securing a view of a region corresponding to a blind spot of an interior rearview mirror and a door mirror of the vehicle.

For example, Japanese Laid-Open Patent Publication No. 2003-81014 discloses a vehicle periphery monitoring apparatus that uses a rearward camera installed on a rear end portion of a vehicle to photograph an image of a region rearward of the vehicle and a pair of lateral cameras installed on a left door mirror and a right door mirror of the vehicle to photograph images of regions laterally rearward of the vehicle. This conventional vehicle periphery monitoring apparatus displays the images on a single display device arranged inside the vehicle. The images are displayed horizontally side by side on the display device so that the image of the region rearward of the vehicle is placed between the images of the regions laterally (left and right) rearward of the vehicle.

SUMMARY OF THE INVENTION

One object of the present invention is to provide a vehicle periphery monitoring apparatus and an image display method that can display a relatively easily recognizable image for a driver of a host vehicle.

In view of the above, a vehicle periphery monitoring apparatus includes an image capturing device, a display device, a blind spot determining section, and a processing section. The image capturing device is configured and arranged to capture an image of a region rearward of a host vehicle equipped with the vehicle periphery monitoring apparatus and an image of a region laterally rearward of the host vehicle. The display device is mounted in an interior of the host vehicle. The blind spot determining section is configured and arranged to determine that a following vehicle created blind spot region exists in the region laterally rearward of the host vehicle upon detecting a parameter indicative of a following vehicle blocking an area of the region laterally rearward of the host vehicle. The processing section is configured to switch a displayed image on the display device from a first display image to a second display image in response to the blind spot determining section determining that the following vehicle created blind spot region exists. The first display image includes the image of the region rearward of the host vehicle, and the second display image includes at least a portion of the image of the region laterally rearward of the host vehicle that encompasses the following vehicle created blind spot region which is absent from the first display image.

BRIEF DESCRIPTION OF THE DRAWINGS

Referring now to the attached drawings which form a part of this original disclosure:

FIG. 3 is a simplified schematic diagram illustrating a traffic situation in which a following vehicle is traveling in a distanced position behind the vehicle in which the vehicle periphery monitoring apparatus is installed;

FIG. 13 is a schematic diagram for explaining an example of a method of determining whether a blind spot region exists in accordance with the first embodiment;

FIG. 14 is a schematic diagram illustrating a traffic situation in which an obstacle, e.g., a two-wheeled vehicle, exists in a position closer to the vehicle in which the vehicle periphery monitoring apparatus is installed than does a following vehicle;

FIG. 15 is a series of diagrams (a) to (c) showing examples of display images displayed on the display device during the traffic situation shown in FIG. 14, wherein the diagram (a) shows an example of a display image obtained when an image of a blind spot region photographed by the right side camera is merely arranged adjacently to the right of a rearward image photographed by a rearward camera, the diagram (b) shows an example of a display image obtained when the area encompassed by the rearward image photographed by the rearward camera is enlarged to such a degree that the existence of the obstacle can be recognized, and the diagram (c) shows an example of a display image obtained when an image of the blind spot region photographed by the right side camera is arranged adjacently to the right of a rearward image photographed by the rearward camera and an icon indicating the existence of the obstacle is superimposed on the combined display image in a position corresponding to where the obstacle is located in accordance with the first embodiment;

FIG. 16 is a simplified block diagram showing the constituent features of a vehicle periphery monitoring apparatus according to a second embodiment;

FIG. 17 is a schematic diagram illustrating a relationship between the region photographed by a rear camera and portions of the image used to generate the display image in the vehicle periphery monitoring apparatus according to the second embodiment;

FIG. 18 is a schematic diagram illustrating a traffic situation in which a large following vehicle is traveling close behind the vehicle in which the vehicle periphery monitoring apparatus is installed in accordance with the second embodiment; and FIG. 19 is a schematic diagram showing an example of a display image displayed on the display device of the vehicle periphery monitoring apparatus during a situation in which a blind spot region exists in accordance with the second embodiment.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
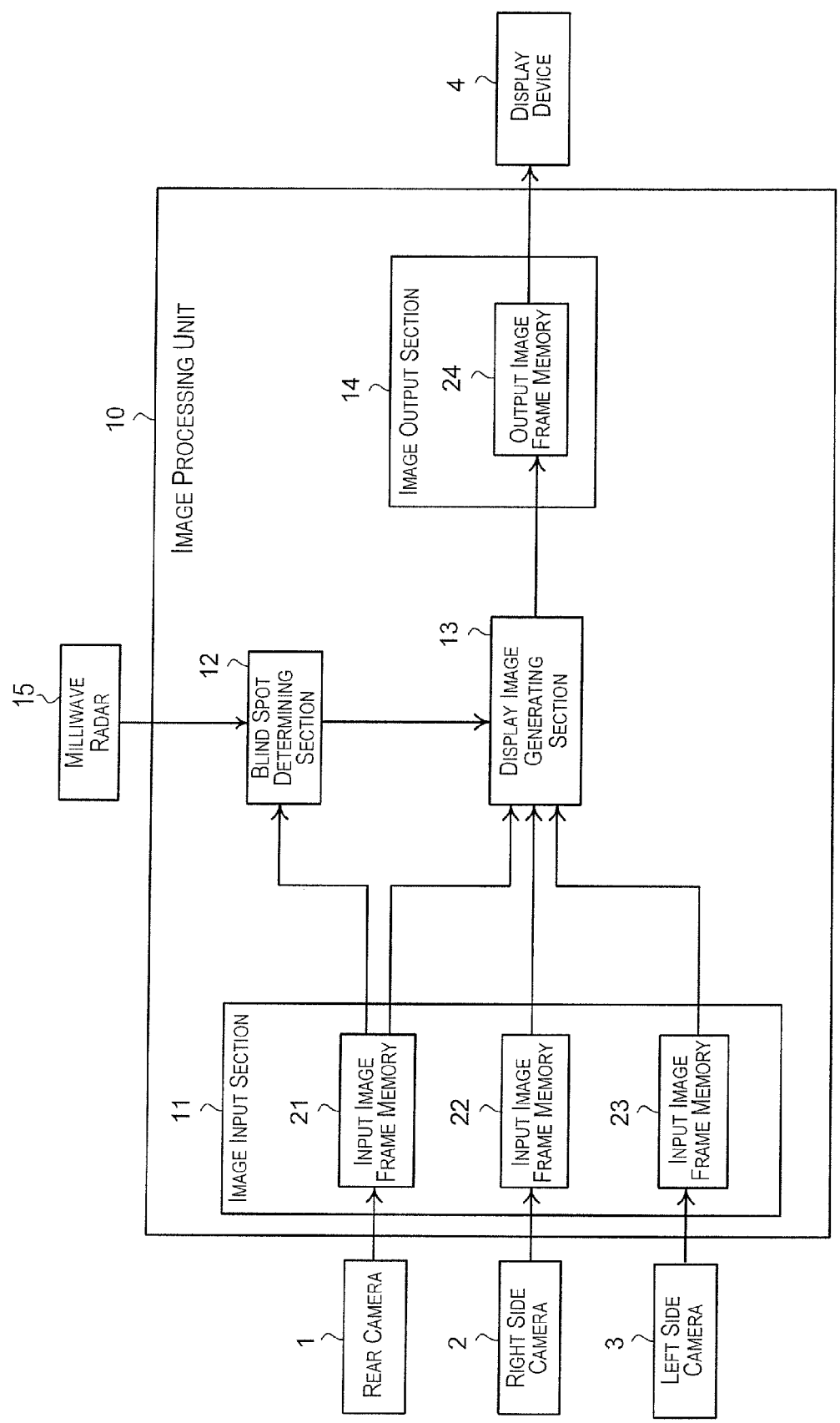
FIG. 1 is a simplified block diagram showing the constituent features of a vehicle periphery monitoring apparatus according to a first embodiment.
Figure 2:
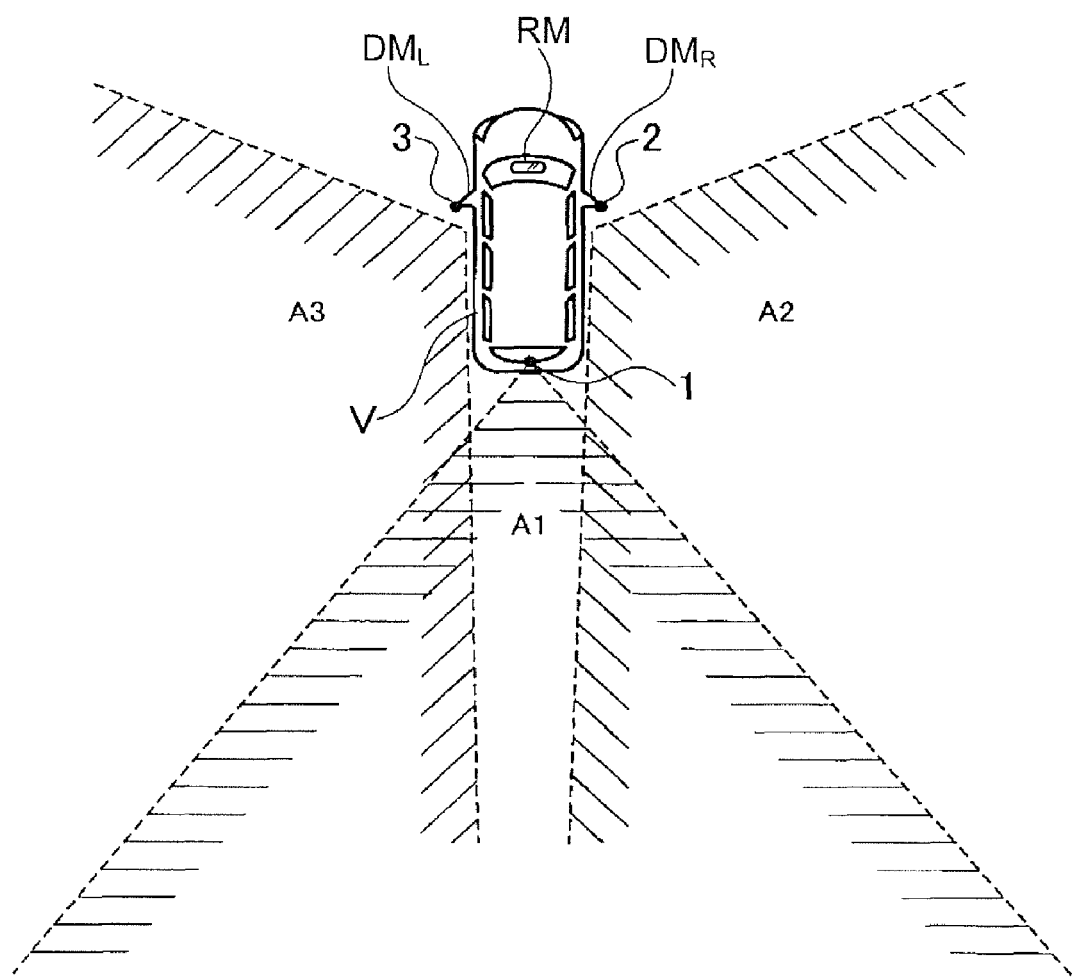
FIG. 2 is a diagram illustrating an example of an arrangement of onboard video cameras used in the vehicle periphery monitoring apparatus in accordance with the first embodiment.

Referring initially to FIGS. 1 and 2, a vehicle periphery monitoring apparatus is illustrated in accordance with a first embodiment of the present invention. In the first embodiment, the vehicle periphery monitoring apparatus is configured and arranged to capture images of a region directly rearward of and laterally rearward of a vehicle in which the vehicle periphery monitoring apparatus is employed (hereinafter called "the host vehicle V") by using a plurality of (i.e., three) onboard video cameras mounted on the host vehicle V. FIG. 1 is a simplified block diagram showing the constituent features of the vehicle periphery monitoring apparatus in accordance with the first embodiment. FIG. 2 is a schematic diagram illustrating an example of an arrangement of the three onboard cameras.

As shown in FIG. 1, the vehicle periphery monitoring apparatus according to the first embodiment has three onboard video cameras including a rear video camera 1, a right side video camera 2 and a left side video camera 3, which collectively constitute an image capturing device. As shown in FIG. 2, the rear camera 1 is installed on a rearward portion of the host vehicle V, the right side camera 2 is installed on a right lateral portion of the host vehicle V, and the left side camera 3 is installed on a left lateral portion of the host vehicle V. The vehicle periphery monitoring apparatus also includes an image processing unit 10 configured to generate an image to be displayed (displayed image) using the images captured by the rear camera 1, the right side camera 2 and the left side camera 3 and a display device (image displaying device) 4 configured to display the display image generated by the image processing unit 10.

As shown in FIG. 2, the rear camera 1 is installed in a prescribed position on a rearward portion of the host vehicle V, e.g., on a roof spoiler. The rear camera 1 is configured and arranged to capture an image of a relatively large region located directly rearward and laterally rearward of the host vehicle V. The region A1 shown in FIG. 2 is an example of the region photographed by the rear camera 1. The right side camera 2 is installed in a prescribed position on a right lateral portion of the host vehicle V, e.g., on a right door mirror DMR. The right side camera 2 is configured and arranged to capture an image of a relatively large region located laterally rearward from the right side of the host vehicle V. The right side camera 2 is thus configured and arranged to photograph from a different view point than the rear camera 1. Therefore, the rear camera 1 corresponds to the first image capturing section, and the right side camera 2 and the left side camera 3 correspond to the second and third image capturing sections of the first embodiment. The region A2 shown in FIG. 2 is an example of the region photographed by the right side camera 2. The left side camera 3 is installed in a prescribed position on a left lateral portion of the host vehicle V, e.g., on a left door mirror DML. The left side camera 3 is configured and arranged to capture an image of a relatively large region located laterally rearward from the left side of the host vehicle V. The left side camera 3 is thus arranged to photograph from a different view point than the rear camera 1. The region A3 shown in FIG. 2 is an example of the region photographed by the left side camera 3. The region rearward of the host vehicle V is a prescribed region centered on a longitudinal center axis of the host vehicle V extended rearwardly from the host vehicle V, e.g., a region corresponding to a region that could be viewed in a rearview mirror RM by a driver of the host vehicle V. The region laterally rearward of the host vehicle V refers to regions positioned on the left and right outer sides of the region rearward of the host vehicle V and corresponds to, for example, regions that the driver of the host vehicle V can view in the left and right door mirrors $DM_L$ and $DM_R$.

Each of the rear camera 1, the right side camera 2 and the left side camera 3 is arranged as a conventional video camera having an optical system comprising a lens and a light-receiving element, e.g., a CCD element or a CMOS element. Light that passes through the lens and strikes the light-receiving element is converted into an electric signal and outputted as an image signal comprising a numerical value for each pixel of the photographed image. The image signal outputted from the rear camera 1, the right side camera 2 and the left side camera 3 is received by the image processing unit 10.

The image processing unit 10 is configured to generate a display image using the images captured by the rear camera 1, the right side camera 2 and the left side camera 3 and to display the generated display image on the display device 4 installed inside the host vehicle V. In the first embodiment, when a following vehicle traveling rearward of the host vehicle V is not close to the host vehicle V, the image of a region rearward of the host vehicle V captured by the rear camera 1 is enlarged in the display image that is generated and displayed on the display device 4. On the other hand, when a following vehicle traveling rearward of the host vehicle V draws close to the host vehicle V such that a blind spot region (the following vehicle created blind spot region) develops laterally of the following vehicle, an image of the blind spot region captured by the right side camera 2 or the left side camera 3 is combined with the image of the region rearward of the host vehicle V captured by the rear camera 1 and the combined image is displayed on the display device 4 as a display image. Thus with the first embodiment, by switching the display image displayed on the display device 4 depending on the presence or absence of the blind spot region resulting from the approach of a following vehicle, an image of a region rearward of the host vehicle V can be displayed such that the driver of the host vehicle V can correctly perceive a distance based on the image, and required information can be presented to the driver of the host vehicle V in an accurate manner when the blind spot region exists due to a following vehicle being close to the host vehicle V.

An overview of the processing executed by the image processing unit 10 will now be explained using a specific traffic situation as an example.

Figure 4:
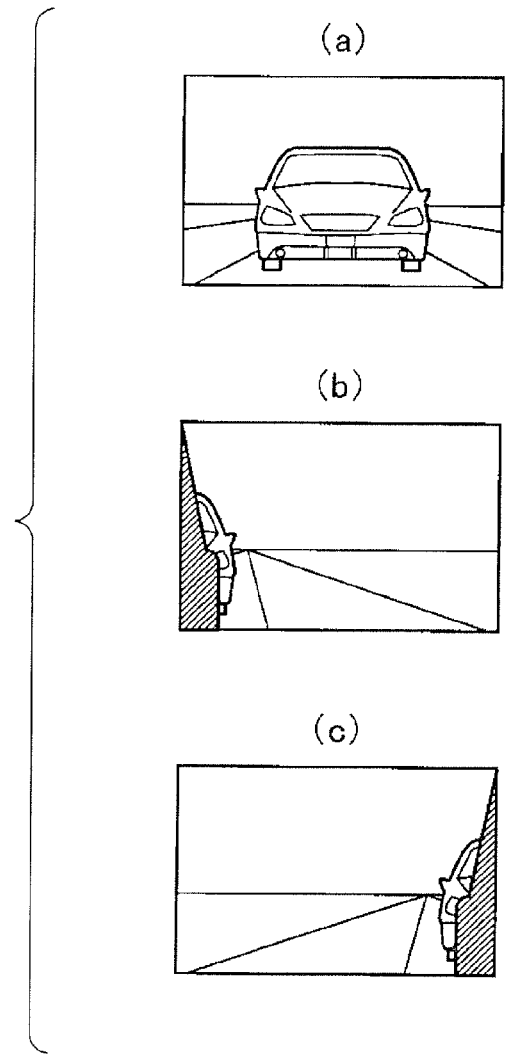
FIG. 4 is a series of schematic diagrams (a) to (c) showing examples of images photographed by three onboard cameras during the traffic situation shown in FIG. 3, wherein the diagram (a) shows an image photographed by a rear video camera, the diagram (b) shows an image photographed by a right side video camera, and the diagram (c) shows an image photographed by a left side video camera.
Figure 5:
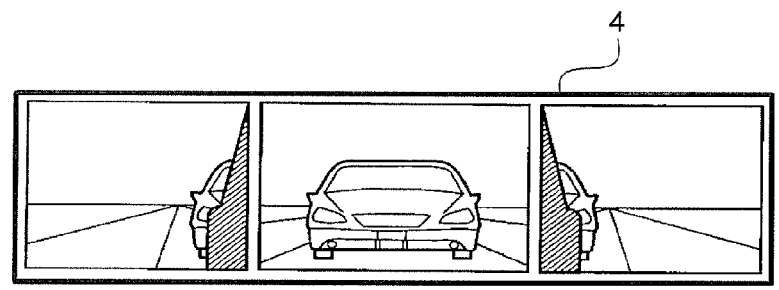
FIG. 5 is a schematic diagram showing a display image obtained when the images photographed by the three onboard cameras shown in FIG. 4 are displayed on a display device arranged horizontally side by side in a comparison example.

Consider a situation in which, as shown in FIG. 3, the host vehicle V is traveling in a middle lane of a road that has three lanes in the traveling direction and a following vehicle V1 is traveling in a distanced position behind the host vehicle V. FIG. 4 is a series of schematic diagrams (a) to (c) showing examples of the images captured by the rear camera 1, the right side camera 2 and the left side camera 3 during the traffic situation shown in FIG. 3. More specifically, the diagram (a) of FIG. 4 is a schematic view of an image of a region rearward of the host vehicle V captured by the rear camera 1, the diagram (b) of FIG. 4 is a schematic view of an image of a region laterally rightward and rearward of the host vehicle V captured by the right side camera 2, and the diagram (c) of FIG. 4 is a schematic view of an image of a region laterally leftward and rearward of the host vehicle V captured by the left side camera 3. FIG. 5 is a schematic diagram of an example of the display image displayed on the display device 4 when the images shown in the diagrams (a) to (c) are arranged side by side into a display image matched to the size of the display region of the display device 4 in a comparison example. Although the display image shown in FIG. 5 enables to present the situation existing in a wide region spanning rearward and rearwardly leftward and rightward of the host vehicle V to the driver of the host vehicle V, the size of the following vehicle V1 appears smaller in the display image on the display device 4 than it would in a mirror reflection image of the rearview mirror RM. Consequently, there is the possibility that the driver will perceive the distance from the host vehicle V to the following vehicle V1 incorrectly.

Figure 6:
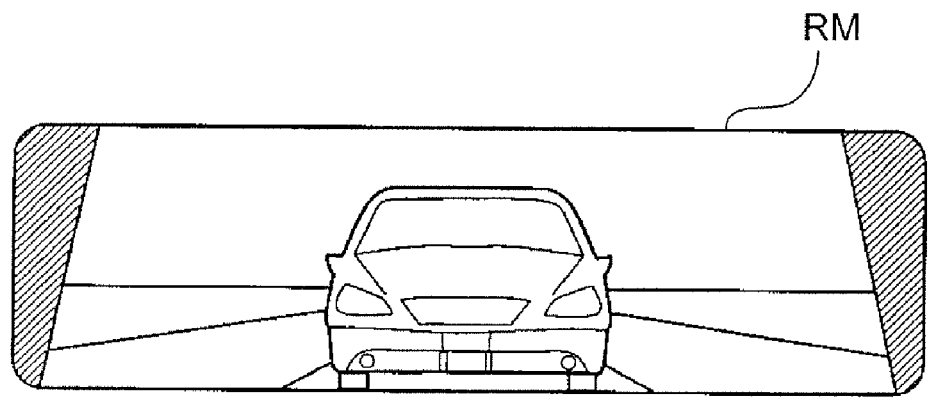
FIG. 6 shows a mirror reflection image of a region rearward of the vehicle that would appear in a rearview mirror of the vehicle during the traffic situation shown in FIG. 3.

In the traffic situation shown in FIG. 3, the mirror reflection image of a region rearward of the host vehicle V that the driver would view in the rearview mirror RM of the host vehicle V would appear, for example, as shown in FIG. 6. Since the driver of the host vehicle V is accustomed to viewing a mirror reflection image of the rearview mirror RM, the driver tends to determine a distance to an object based on the size of the object in the mirror reflection image. Consequently, if the size of a following vehicle V1 appearing in the display image on the display device 4 is smaller than it would appear in a mirror reflection image of the review mirror RM, then the driver of the host vehicle V will mistakenly conclude that the following vehicle V1 is farther than it actually is when the driver views the following vehicle V1 in the display image on the display device 4.

Figure 7:
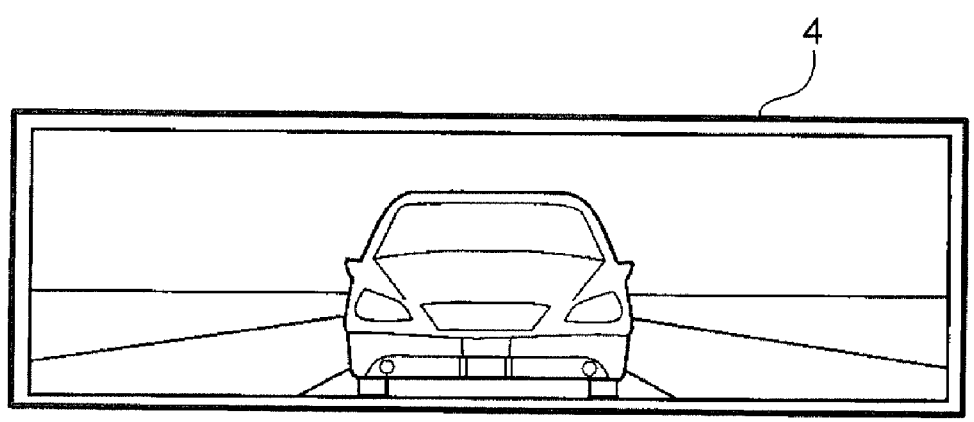
FIG. 7 shows an example of a display image displayed on a display device of the vehicle periphery monitoring apparatus according to the first embodiment during a situation in which a blind spot region does not exist in accordance with the first embodiment.

A feasibly effective way to avoid such a problem is to display only the rearward image captured by the rear camera 1 on the display device 4 and enlarge the image photographed by the rear camera 1 such that the size of the display image displayed on the display device 4 is substantially equal to the size of a mirror reflection image viewed in the rearview mirror RM as shown in FIG. 7. In this way, the headway distance between the host vehicle V and the following vehicle V1 can be perceived by the driver more easily. This approach is also advantageous in that it is easier to grasp the situation existing rearward of the host vehicle V when viewing an image from a single viewpoint than when viewing images captured from a plurality of viewpoints (e.g., the rear camera 1, the right side camera 2 and the left side camera 3) and displayed in the manner shown in FIG. 5. However, with the display image like the one shown in FIG. 7, a different problem may occur in a different traffic situation such that the vehicle periphery monitoring apparatus is not able to present required information to the driver of the host vehicle V in an appropriate manner.

Figure 8:
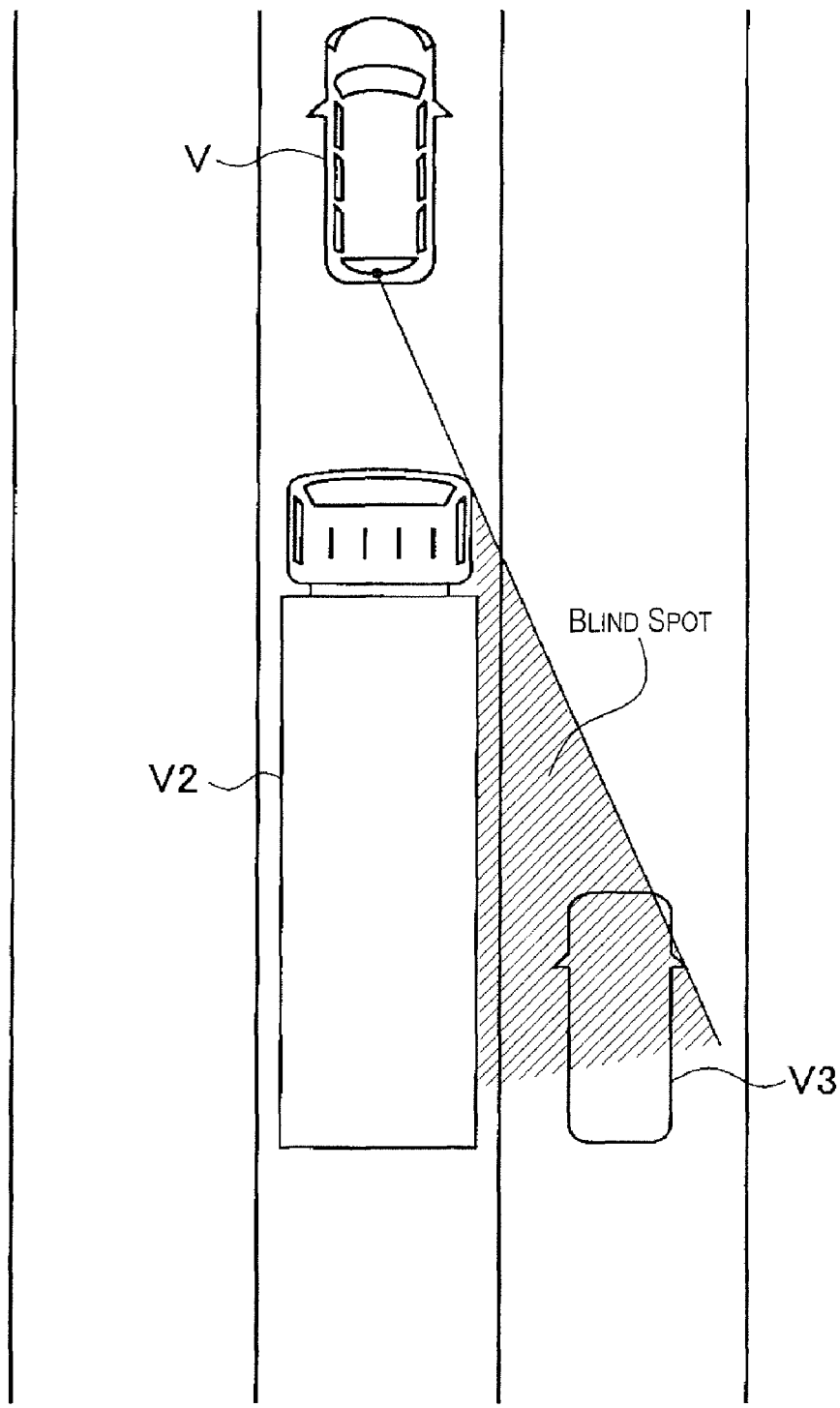
FIG. 8 is a schematic diagram illustrating a traffic situation in which a large following vehicle is traveling close behind the vehicle in which the vehicle periphery monitoring apparatus is installed in accordance with the first embodiment.
Figure 9:
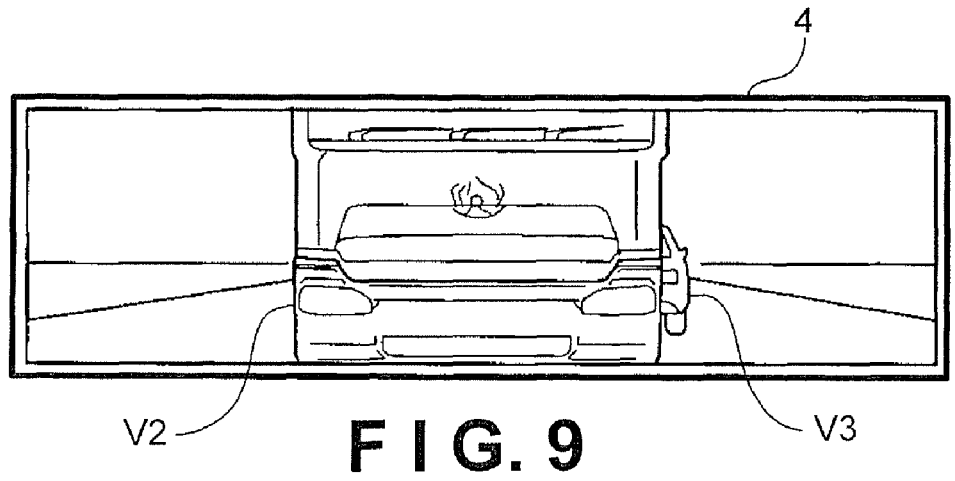
FIG. 9 is a schematic diagram showing a display image obtained when an image of a region rearward of the vehicle is enlarged and displayed on the display device during the traffic situation shown in FIG. 8 in a comparison example.

For example, in a traffic situation shown in FIG. 8, a large following vehicle V2 (e.g., a truck) is approaching closely to the rear of the host vehicle V and another following vehicle V3 is traveling along side the following vehicle V2 in the adjacent lane to the right of the lane in which the host vehicle V is traveling. Due to the close proximity of the following vehicle V2, a blind spot region (the following vehicle created blind spot region) that cannot be photographed by the rear camera 1 exists to the side of the following vehicle V2 as shown in FIG. 8. Although only the blind spot region on the right side rearward region of the host vehicle V is illustrated in FIG. 8, the blind spot region is also created on the left side rearward region of the host vehicle V due to the existence of the following vehicle V2. In the traffic situation shown in FIG. 8, the fact that the following vehicle V3 is traveling in the adjacent lane to the right is very important information for the driver of the host vehicle V for determining if it is safe to change lanes into the adjacent lane to the right. However, if only the image captured by the rear camera 1 is displayed on the display device 4 as the first display image as shown in FIG. 9, then the driver of the host vehicle V will not be able to clearly recognize the existence of the following vehicle V3 in the display image on the display device 4. Therefore, there is the possibility that the driver will make an incorrect determination regarding changing lanes.

Accordingly, in the vehicle periphery monitoring apparatus of the first embodiment, the image processing unit 10 is configured and arranged to determine whether a blind spot region that cannot be photographed by the rear camera 1 exists laterally of a following vehicle due to the following vehicle being close to the host vehicle V. While a blind spot region does not exist, the image of a region rearward of the host vehicle V captured by the rear camera 1 is displayed on the display device 4 such that it is enlarged into an image size equivalent to a mirror reflection image of a rearview mirror (as shown in FIG. 6). On the other hand, if it is determined that a blind spot region exists, then images of the blind spot region captured by the right side camera 2 and the left side camera 3 are combined with the image of a region rearward of the host vehicle V captured by the rear camera 1 to generate a display image (second display image) shown in, for example, FIG. 10 or 11 to be displayed on the display device 4. In the example shown in FIG. 10, images R2 and R3 of the blind spot regions captured by the right side camera 2 and the left side camera, respectively, are superimposed on an image R1 captured by the rear camera 1 in a position generally corresponding to where the blind spot regions are. In the example shown in FIG. 11, the images R2 and R3 of the blind spot regions captured by the right side camera 2 and the left side camera 3 are arranged adjacently on the right side and left side of the rearward image R1 captured by the rear camera 1.

Referring back to FIG. 1, the processing executed by the image processing unit 10 in order to generate a display image will now be explained in more detail. As shown in FIG. 1, the image processing unit 10 includes an image input section 11, a blind spot determining section (determining device) 12, a display image generating section (processing section) 13, and an image output section 14.

The image processing unit 10 preferably includes a microcomputer with an image processing control program that controls the image input section 11, the blind spot determining section 12, the display image generating section 13 and the image output section 14 as discussed below. The image processing unit 10 can also include other conventional components such as an input interface circuit, an output interface circuit, and storage devices such as a ROM (Read Only Memory) device and a RAM (Random Access Memory) device. The microcomputer of the image processing unit 10 is programmed to control the display device 4 and other components of the vehicle periphery monitoring apparatus. The memory circuit stores processing results and control programs such as the ones for blind spot determining operation and image converting operation that are run by the processor circuit. The image processing unit 10 is operatively coupled to the rear camera 1, the right side camera 2, the left side camera 3, and the display device 4 in a conventional manner.

The image input section 11 of the image processing unit 10 is configured to separately receive the images captured by the three onboard cameras, i.e., the rear camera 1, the right side camera 2 and the left side camera 3. The image input section 11 includes three input image frame memories 21, 22 and 23 each comprising a RAM. The input image frame memory 21 corresponds to the rear camera 1, the input image frame memory 22 corresponds to the right side camera 2, and the input image frame memory 23 corresponds to the left side camera 3. The images captured by the rear camera 1, the right side camera 2, and the left side camera 3 are each converted into a digital signal in accordance with the frame size of the input image and stored frame by frame in the input image frame memories 21, 22 and 23, respectively.

Figure 12:
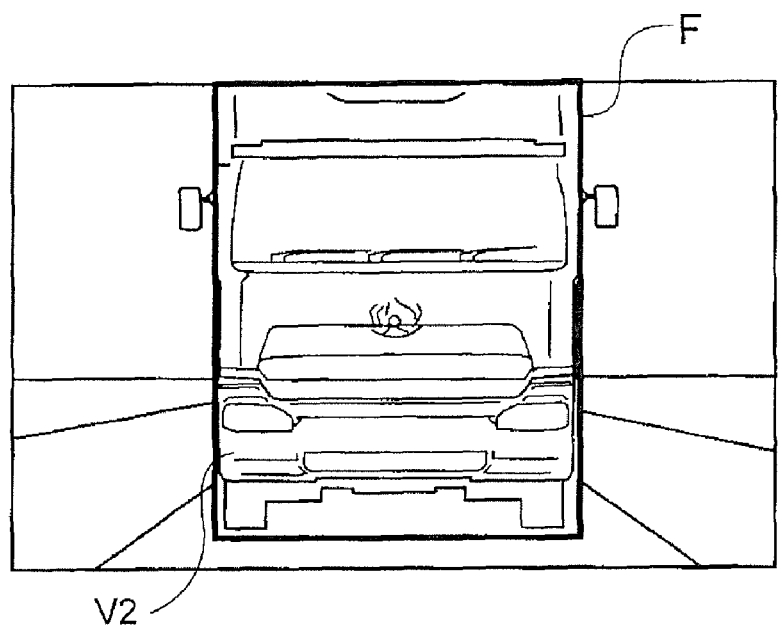
FIG. 12 is a schematic diagram for explaining a method of applying image processing to an image photographed by the rear camera in order to detect the following vehicle traveling close behind the vehicle in which the vehicle periphery monitoring apparatus is installed in accordance with the first embodiment.

The blind spot determining section 12 of the image processing unit 10 is configured to determine whether a blind spot region (following vehicle created blind spot region) that cannot be photographed by the rear camera 1 exists laterally of a following vehicle due to the following vehicle being close to the host vehicle V. More specifically, the blind spot determining section 12 is configured to determine that the following vehicle created blind spot region exists in the region laterally rearward of the host vehicle upon detecting a parameter indicative of a following vehicle blocking an area of the region laterally rearward of the host vehicle V. For example, the blind spot determining section 12 is configured to apply conventional image processing techniques such as edge detection and pattern recognition to the image captured by the rear camera 1 and stored in the input image frame memory 21 of the image input section 11 in order to detect a following vehicle approaching closely behind the host vehicle V in the same lane as the host vehicle V. When the following vehicle is detected to be approaching closely behind the host vehicle V, then the blind spot determining section 12 is configured to approximate the shape of the following vehicle with a rectangular frame F, as shown in FIG. 12. Then, the blind spot determining section 12 is configured to calculate the position and size of the following vehicle based on the position and size of the frame F in the image captured by the rear camera 1. More specifically, the relationship between the actual position of the following vehicle in the region rearward of the host vehicle V and the position of the following vehicle in a coordinate system established in the image captured by the rear camera 1 can be specified in a unique manner based on the position and angle at which the rear camera 1 is installed and the angle of view of the rear camera 1. Consequently, the position of the following vehicle in the region rearward of the host vehicle V (i.e., the headway distance between the host vehicle V and the following vehicle) can be calculated based on the position of the bottom edge of the frame F in the image photographed by the rear camera 1. Then, based on the calculated position of the following vehicle, the size (vehicle width) of the following vehicle can be calculated based on the horizontal width of the frame F in the image photographed by the rear camera 1.

Although, in the first embodiment, the position and size of the following vehicle are calculated by executing image processing with respect to the rearward image captured by the rear camera 1, the size and position of the following vehicle can also be calculated based on information detected by a conventional onboard object detecting device (e.g., a milliwave radar 15 or a laser radar) if such an object detecting device is installed on the host vehicle V. The size and position of the following vehicle can also be calculated based on both the results of an image processing applied to the image captured by the rear camera 1 and information detected by the onboard object detecting device.

Based on the calculated position and size of the following vehicle, the blind spot determining section 12 is configured to determine whether the close proximity of the following vehicle has caused a blind spot region that cannot be photographed by the rear camera 1 to develop laterally of the same following vehicle. Consider, for example, a case in which the host vehicle V is traveling in the middle lane of a three lane road and the following vehicle V2 (e.g., a truck) is traveling behind the host vehicle V as shown in FIG. 13. In the situation shown in FIG. 13, a distance L1 from the host vehicle V to the following vehicle V2 and a width W of the following vehicle V2 are detected according to the procedure described above. Then, a hypothetical point M1 is set at a position where a line extended in the transverse direction of the host vehicle V from an edge portion of the host vehicle V where the rear camera 1 is installed intersects with a centerline C of an adjacent lane, and a hypothetical point M2 is set at a position where a line L3 extended from the rear camera 1 so as to contact an edge portion of the following vehicle V2 intersects the centerline C. If a distance L2 between the two points M1 and M2 is equal to or smaller than a prescribed threshold value, then the blind spot determining section 12 is configured to determine that a blind spot exists laterally of the following vehicle V2. More specifically, if the following vehicle V2 is traveling while maintaining a certain distance with respect to the host vehicle V, then the distance L2 will be relatively long and a blind spot will not occur. Conversely, if the following vehicle V2 has drawn close to the host vehicle V, then the distance L2 will be shorter and it is highly likely that a blind spot exists. The blind spot determining section 12 can also be configured to simply determine that a blind spot region exists laterally of the following vehicle V2 when the headway distance L1 between the host vehicle V and the following vehicle V2 is equal to or smaller than a prescribed threshold value. Some degree of a blind spot that cannot be photographed by the rear camera 1 will occur whenever a following vehicle exists behind the host vehicle V, but a slight blind spot can be ignored from the perspective of monitoring the periphery of the host vehicle V. In the first embodiment, the term "blind spot region" refers to a blind spot that is large enough to substantially hide another following vehicle or two wheeled vehicle traveling in an adjacent lane.

Using the method described above, the blind spot determining section 12 is configured to determine whether a blind spot region that cannot be photographed by the rear camera 1 exists laterally of a following vehicle due to the close proximity of the following vehicle. If the blind spot determining section 12 determines that a blind spot region exists, then the blind spot determining section 12 is configured to send information indicating that the blind spot region exists to the display image generating section 13.

So long as information indicating that a blind spot region exists is not received from the blind spot determining section 12, the display image generating section 13 is configured to use the image captured by the rear camera 1 to generate a display image in which the image of the region rearward of the host vehicle V is enlarged into an image size equivalent to a mirror reflection image of the rearview mirror RM, as shown in, for example, FIG. 7. If the display region of the display device 4 is large enough, it is acceptable to generate a display image that includes an image of a region laterally rearward of the host vehicle V in the display image in addition to an image of the region rearward of the host vehicle V.

More specifically, the display image generating section 13 is configured to generate the display image by taking the pixel data of an image that was captured by the rear camera 1 and stored as a frame in the input image frame memory 21 of the image input section 11 and rearranging the pixel data into an output image frame memory 24 of the image output section 14 based on a definition table. The definition table used here stipulates the correspondence between each pixel stored in the output image frame memory 24 and a coordinate system (camera coordinate system) of the input image frame memory 21, i.e., the location of each pixel in the coordinate system, for a case in which the image of the region rearward of the host vehicle V captured by the rear camera 1 will be enlarged to an image size equivalent to a mirror reflection image of the rearview mirror RM.

Alternatively, the rear camera 1 can be provided with a zoom in/out function so that the display image can be obtained by zooming in on a prescribed rearward region of the host vehicle V at a prescribed zoom in ratio to capture an image having an image size corresponding to the mirror reflection image of the rearview mirror RM.

Figure 10:
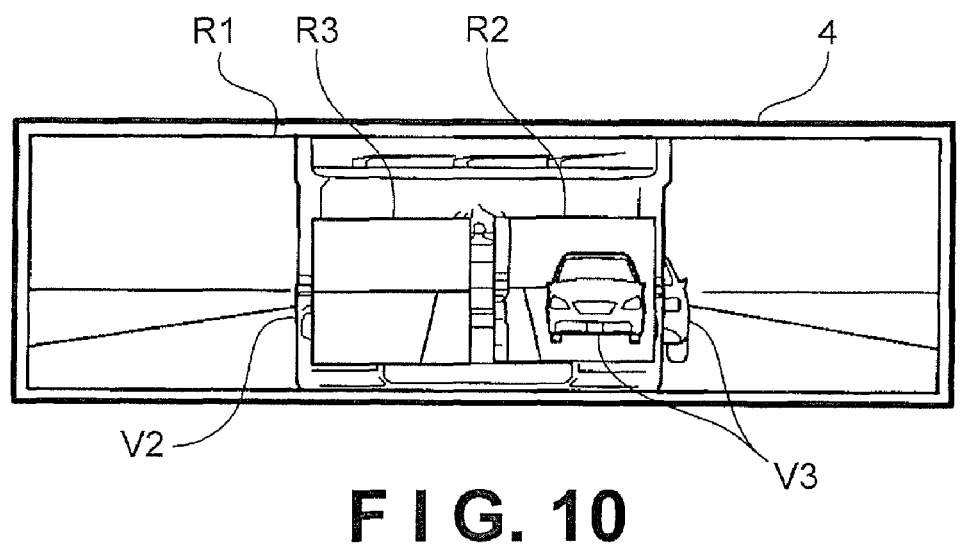
FIG. 10 shows an example of a display image displayed on the display device of the vehicle periphery monitoring apparatus during a situation in which a blind spot region exists in accordance with the first embodiment.
Figure 11:
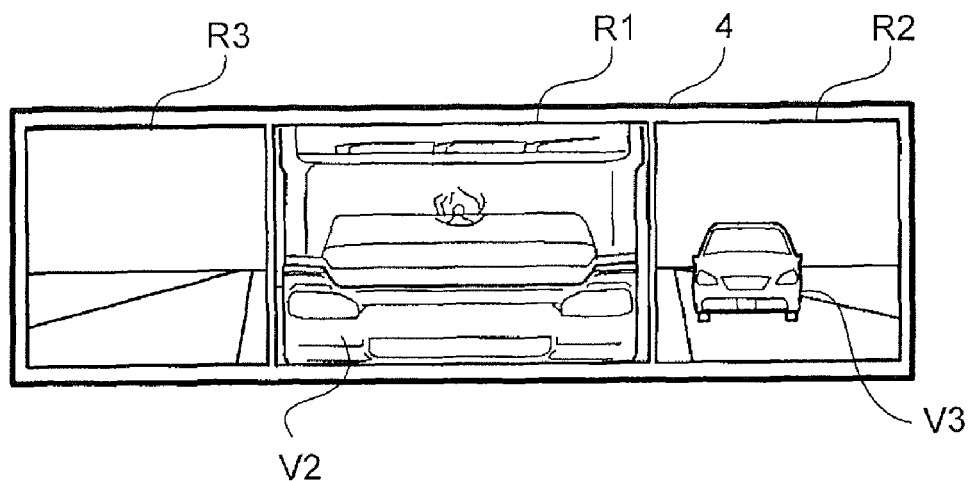
FIG. 11 shows another example of a display image displayed on the display device of the vehicle periphery monitoring apparatus during a situation in which a blind spot region exists in accordance with the first embodiment.

When the blind spot determining section 12 sends information indicating that a blind spot region exists, the display image generating section 13 is configured to switch a displayed image on the display device 4 from the image (first display image) of the region rearward of the host vehicle V, which is enlarged into an image size equivalent to a mirror reflection image of the rearview mirror RM, as shown in, for example, FIG. 9 to the display image including at least a portion of the image of the region laterally rearward of the host vehicle that encompasses the blind spot region which is absent from the display image shown in FIG. 9. More specifically, the display image generating section 13 is configured to combine the images of the blind spot regions captured by the right side camera 2 and the left side camera 3 with the image of a region rearward of the host vehicle V captured by the rear camera 1 to generate a display image (second display image) like one of those shown in, for example, FIGS. 10 and 11. As shown in FIGS. 10 and 11, this display image includes at least portions of the images of the region laterally rearward of the host vehicle V that encompass the blind spot region which is absent from the display image shown in FIG. 9. More specifically, the display image generating section 13 is configured to generate the display image by, for example, using the definition table described above to rearrange the pixel data of the image captured by the rear camera 1 into the output frame memory 24 of the image output section 14 and extracting pixel data of partial images corresponding to the blind spot regions from the image captured by the right side camera 2 and stored in the input image frame memory 22 and the image captured by the left side camera 3 and stored in the input image frame memory 23. The extracted pixel data corresponding to the blind spot regions are then copied to prescribed positions in the output image frame memory 24 of the image output section 14.

The copy destination of the partial image corresponding to the blind spot region extracted from the image captured by the right side camera 2 or the image captured by the left side camera 3 is a position substantially corresponding to where the blind spot region is located in the rearward image captured by the rear camera 1, i.e., a position located adjacently to the left or right of the rearward image captured by the rear camera 1. When the copy destination of the partial image corresponding to the blind spot image is determined in advance, then the correspondence relationship between the pixels of copy source, i.e., the input image frame memory 22 or 23, and the position of the output image frame memory 24 that will serve as the copy destination can be specified. The correspondence relationship can be used to establish a blind spot region definition table in advance, thus enabling a display image such as the one shown in FIG. 10 or 11 to be generated readily.

In the examples shown in FIGS. 10 and 11, both the images R2 and R3 of the blind spot regions captured by the right side camera 2 and the left side camera 3 are combined with the rearward image photographed by the rear camera 1 in order to enable the driver to see the blind spot regions on the right and left sides of the host vehicle V. Thus, the driver of the host vehicle V is able to see a passing vehicle (the following vehicle V3) that is on the right side of the host vehicle V. However, it is also acceptable to arrange the apparatus to combine only one of the images R2 and R3 of the blind spot region captured by the right side camera 2 or the left side camera 3 with the rearward image captured by the rear camera 1 or to automatically select either an image of a blind spot region captured by the right side camera 2 or an image of a blind spot region captured by the left side camera 3 to be combined with the rearward image captured by the rear camera 1 depending on the current lane, traveling speed, and traffic situation of the host vehicle V. The vehicle periphery monitoring apparatus can also be configured and arranged to select which image to combine based on an operation condition of the host vehicle V (e.g., a driver's intention to change lanes being detected or the like). For example, the vehicle periphery monitoring apparatus can be configured to change the display image from only the rearward image of the host vehicle V (e.g., FIG. 7) to the combined image of the image of a rearward region of the host vehicle V and an image of a blind spot region on the right side captured by the right side camera 2 when it is detected that a driver intends to change lanes toward the right side lane based on an operation of a direction indicator and it is determined by the blind spot determining section 12 that a blind spot exists. In any of these cases, the trigger for switching the display image is a determination that a blind spot region that cannot be photographed by the rear camera 1 exists laterally of a following vehicle due to a close proximity of the following vehicle.

The image output section 14 is equipped with the output image frame memory 24 comprising a RAM. The image output section 14 is configured to send a display image generated by the display image generating section 13 to the display device 4. More specifically, the image combining and output section 14 is configured to sequentially output the display image to form a plurality of frames of a video sequence displayed on the display device 4. Thus, the driver of the host vehicle V can watch a video sequence of the regions rearward of the host vehicle V displayed on the display device 4 on a substantially real-time basis. As explained previously, the image data for the display image generated by the display image generating section 13 is stored in the output image frame memory 24. The image data of the display image stored in the output image frame memory 24 of the image output section 14 is sequentially outputted to the display device 4. As a result, in a situation in which a following vehicle is not traveling close behind the host vehicle V, a display image obtained by enlarging an image of a region rearward of the host vehicle V to an image size equivalent to a mirror reflection image of the rearview mirror RM is displayed on the display device 4 as shown, for example, in FIG. 7. On the other hand, in a situation in which a following vehicle draws close behind the host vehicle V such that a blind spot region develops, a display image obtained by combining an image of the blind spot region captured by the right side camera 2 or the left side camera 3 with the rearward image captured by the rear camera 1 is displayed on the display device 4 as shown in, for example, FIG. 10 or 11.

During a situation in which a blind spot region exists and a display image such as the one shown in FIG. 10 or 11 is displayed on the display device 4, there is the possibility that an obstacle M, e.g., a motorcycle or two-wheeled vehicle, will exist between the host vehicle V and the following vehicle V2 (i.e., closer to the host vehicle V than the following vehicle V2) in a position where the obstacle M is not shown in the image displayed on the display device 4 or where only a portion the obstacle M can be shown in the image displayed on the display device 4. An example of such a situation is illustrated in FIG. 14. In such a situation, there is the possibility that the obstacle M will be hidden in the combined image and the driver of the host vehicle V will not be able to recognize the obstacle M in the display image displayed on the display device 4. For example, in the traffic situation shown in FIG. 14, the blind spot determining section 12 determines that a blind spot region exists laterally of the following vehicle V2 due to the close proximity of the following vehicle V2 as explained above. If the display image is generated by the display image generating section 13 by arranging the image of the blind spot region photographed by the right side camera 2 adjacently on the right side of the extracted portion of the rearward image photographed by the rear camera 1, then the display image displayed on the display device 4 will appear as shown in a schematic diagram (a) of FIG. 15. Therefore, it will be difficult to recognize the obstacle M (e.g., a two-wheeled vehicle) from the display image displayed on the display device 4.

Accordingly, the vehicle periphery monitoring apparatus of the first embodiment is preferably further configured and arranged to detect the obstacle M (e.g., a two-wheeled vehicle) existing nearby the host vehicle V in the image processing unit 10. The display image generating section 13 is configured to generate a display image in which the existence of the obstacle M can be recognized on the display device 4 when the obstacle M is detected while a blind spot region exists. More specifically, it is preferable for the display image generating section 13 to be configured to display a display image such as the one shown in, for example, a schematic diagram (b) or (c) of FIG. 15 on the display device 4 when the obstacle M is detected nearby the host vehicle V while a blind spot region exists. In the example shown in the diagram (b) of FIG. 15, the region encompassed by the rearward image captured by the rear camera 1 is enlarged such that the existence of the obstacle M can be recognized in the display image. In the example shown in the diagram (c) of FIG. 15, an icon indicating the existence of the obstacle M is superimposed on the generated display image in a position corresponding to where the obstacle M is located. In this way, a driver of the host vehicle V can be made aware that a two-wheeled vehicle or other obstacle M exists nearby the host vehicle V. The vehicle periphery monitoring apparatus can be configured and arranged to detect the obstacle M, for example, in a manner similar to the blind spot region determination processing executed by the blind spot determining section 12, i.e., by executing a conventional image processing technique as edge detection or pattern recognition to the image captured by the rear camera 1. The obstacle M can also be detected using a detection result of a conventional onboard object detecting device (e.g., a milliwave radar 15 or a laser radar) if such an object detecting device is installed on the host vehicle V.

As described in detail above based the first embodiment, the vehicle periphery monitoring apparatus is configured and arranged such that when a following vehicle is not traveling close behind the host vehicle V, a display image obtained by enlarging an image of a region rearward of the host vehicle V to an image size equivalent to a mirror reflection image of the rearview mirror RM is displayed on the display device 4 such that the driver of the host vehicle V can perceive a distance correctly based on the rearward image displayed on the display device 4. The vehicle periphery monitoring apparatus according to this embodiment is further configured and arranged such that when a following vehicle is traveling close behind the host vehicle V so that a blind spot region that cannot be photographed by the rear camera 1 develops laterally of the following vehicle, a display image obtained by combining an image of the blind spot region photographed by the right side camera 2 or the left side camera 3 with the rearward image photographed by the rear camera 1 is displayed on the display device 4. As a result, information regarding the situation in a blind spot region existing laterally of a following vehicle can be presented to the driver of the host vehicle V.

Accordingly, with the vehicle periphery monitoring apparatus of the first embodiment, the image of the region rearward of the host vehicle can be displayed with a relatively large size on the display device 4 when a following vehicle is close to the vehicle such that the driver of the host vehicle can accurately perceive a distance to the following vehicle based on the image displayed on the display device 4. On the other hand, when a following vehicle draws close to the vehicle such that a blind spot region develops in a region laterally of the following vehicle, a situation existing in the blind spot region located laterally of the following vehicle can be presented to the driver of the host vehicle V.

Second Embodiment

Referring now to FIGS. 16-19, a vehicle periphery monitoring apparatus in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The vehicle periphery monitoring apparatus of the second embodiment differs from the vehicle periphery monitoring apparatus of the first embodiment in that the vehicle periphery monitoring apparatus of the second embodiment is equipped with a single onboard video camera (the rear camera 1) instead of a plurality of onboard video cameras (the rear camera 1, the right side camera 2 and the left side camera 3) of the first embodiment. FIG. 16 is a block diagram showing the constituent features of the vehicle periphery monitoring apparatus in accordance with the second embodiment. FIG. 17 is a schematic diagram illustrating a relationship between the region photographed by the rear camera 1 and portions of the image used for the display image.

In the vehicle periphery monitoring apparatus according to the second embodiment, an image of a region rearward of the host vehicle V and a region laterally rearward of the host vehicle V is photographed by the rear camera 1 installed on a rearward portion of the host vehicle V. In a situation in which a following vehicle is not traveling close behind the host vehicle V, a display image obtained by extracting or cropping only a portion of the image captured by the rear camera 1 that corresponds to the region rearward of the host vehicle V and enlarging the extracted portion to an image size equivalent to a mirror reflection image of a rearview mirror is displayed on the display device 4. On the other hand, in a situation in which a following vehicle traveling behind the host vehicle V draws close behind the host vehicle V such that a blind spot region that cannot be captured in an image of the region rearward of the host vehicle V develops, the image of a region rearward of the host vehicle V and a region laterally rearward of the host vehicle V captured by the rear camera 1 is displayed on the display device 4. As shown in FIG. 16, the constituent features of this vehicle periphery monitoring apparatus are basically the same as the constituent features of the first embodiment, except that the vehicle periphery monitoring apparatus of the second embodiment does not include the right side camera 2, the left side camera 3, or the input image frame memories 22 and 23 for storing images captured by the right side camera 2 and the left side camera 3.

As explained in the first embodiment, the rear camera 1 is arranged in a prescribed position on the rearward portion of the host vehicle V, e.g., on a roof spoiler. The rear camera 1 is configured to photograph an image of a relatively large region located rearward and laterally rearward of the host vehicle V. The region A1 shown in FIG. 17 is an example of the region photographed by the rear camera 1. The region rearward of the host vehicle V is a prescribed region centered on a longitudinal center axis of the host vehicle V extended rearwardly from the host vehicle V, e.g., a region corresponding to a region that could be viewed in the rearview mirror RM by the driver of the host vehicle V (i.e., the region B1 shown in FIG. 17). The region laterally rearward of the host vehicle V refers to regions positioned on the left and right outer sides of the region B1 rearward of the host vehicle V and corresponds to, for example, regions that a driver of the host vehicle V can view in the left and right door mirrors (i.e., the regions B2 and B3 shown in FIG. 17).

The image of the region B1 rearward of the host vehicle V and the regions B2 and B3 laterally rearward of the host vehicle V captured by the rear camera 1 is digitalized and stored frame by frame in the input image frame memory 21 provided in the image input section 11 of the image processing unit 10.

The blind spot determining section 12 of the image processing unit 10 is configured to use basically the same method as that used in the first embodiment to determine whether a blind spot region that cannot be photographed with the rear camera 1 exists laterally of a following vehicle due to the following vehicle being close to the host vehicle V. More specifically, the blind spot determining section 12 is configured to calculate the size and position of a following vehicle by executing a conventional image processing such as edge detection or pattern recognition with respect to an image captured by the rear camera 1. Alternatively, as in the first embodiment, if the vehicle is equipped with a conventional onboard object detecting device (e.g., a milliwave radar or a laser radar), the blind spot determining section 12 can calculate the size and position of the following vehicle based on a detection result of the conventional object detecting device. Then, based on the position and size of the following vehicle, the blind spot determining section 12 is configured to determine a viewable distance that can be photographed by the rear camera 1 in an adjacent lane rearward of the host vehicle V and to determine whether a blind spot region exists by determining if the viewable distance is equal to or smaller than a prescribed threshold value. It is also acceptable for the blind spot determining section 12 to determine whether a blind spot region exists by determining if the headway distance between the host vehicle V and the following vehicle is equal to or smaller than a prescribed value. If the blind spot determining section 12 determines that a blind spot region exists, then the blind spot determining section 12 is configured to output information indicating that a blind spot region exists to the display image generating section 13.

So long as information indicating that a blind spot region exists is not received from the blind spot determining section 12, the display image generating section 13 is configured to extract an image of a region rearward of the host vehicle V (region B1 in FIG. 17) from the image captured by the rear camera 1 and to generate a display image in which the image of the region rearward of the host vehicle V (region B1 in FIG. 17) is enlarged in to an image size equivalent to a mirror reflection image of the rearview mirror RM. Similarly to the first embodiment, the generation of a display image can be accomplished by taking the pixel data of an image that was photographed by the rear camera 1 and stored as a frame in the input image frame memory 21 of the image input section 11 and rearranging the pixel data into the output image frame memory 24 of the image output section 14 based on a definition table.

If the display image generating section 13 receives information indicating that a blind spot region exists from the blind spot determining section 12, then the display image generating section 13 is configured to generate the display image by converting the image of the region rearward of the host vehicle V and the regions laterally rearward of the host vehicle V captured by the rear camera 1 (i.e., the image of the regions B1, B2, and B3 shown in FIG. 17) into images whose sizes are matched to the display regions of the display device 4. Here, too, the generation of the display image can be accomplished by rearranging the pixel data stored in the input image frame memory 21 (i.e., the pixel data of the image photographed by the rear camera 1) into the output image frame memory 24 using a definition table configured to accommodate a wide area image encompassing a region rearward of the host vehicle V and regions laterally rearward of the host vehicle V.

With the second embodiment, the image processing unit 10 is configured to switch the display image generated by the display image generating section 13 between an enlarged image (first display image) of a region rearward of the host vehicle V (encompassing the region B1) and a wide area image (second display image) of regions rearward and laterally rearward of the host vehicle V (encompassing the regions B1, B2 and B3) depending on the presence or absence of a blind spot region. Therefore, an image of a region rearward of the host vehicle V can be displayed such that the driver of the host vehicle V can correctly perceive a distance based on the image displayed on the display device 4 and required information can be presented to the driver of the host vehicle V in an accurate manner when a blind spot region exists due to a following vehicle being close to the host vehicle V.

The switching of the display image in the second embodiment will now be explained based on the traffic situation exemplified in FIG. 18. In the traffic situation shown in FIG. 18, a large following vehicle V2 (e.g., a truck) is approaching closely to the rear of the host vehicle V and another following vehicle V3 is traveling along side the following vehicle V2 in the adjacent lane to the right of the lane in which the host vehicle V is traveling. In FIG. 18, the region B1 is a region rearward of the host vehicle V photographed by the rear camera 1 and the regions B2 and B3 are regions laterally rearward of the host vehicle V photographed by the rear camera 1.

In the traffic situation shown in FIG. 18, although a blind spot region exists laterally of the following vehicle V2 due to the close proximity of the following vehicle V2 to the host vehicle V, the other following vehicle V3 traveling in the right-hand adjacent lane can be partially photographed by the rear camera 1 because a portion of the following vehicle V3 is positioned outside the blind spot region. However, if only the image of a region rearward of the host vehicle V photographed by the rear camera 1 (i.e., the image of the region B1 shown in FIG. 18) is enlarged and used as the display image, then the following vehicle V3 will not be included in the display image even though it can be photographed by the rear camera 1 and a driver of the host vehicle V will not be able to recognize the existence of the following vehicle V3 based on the display image. Therefore, in this embodiment, when a blind spot region develops laterally of a following vehicle V2 due to the following vehicle V2 being close to the host vehicle V, the display image is switched from an enlarged image of a region rearward of the host vehicle V (the region B1) to a wide area image encompassing regions rearward and laterally rearward of the host vehicle V (i.e., an image of the regions B1, B2, and B3 shown in FIG. 18) such that the driver of the host vehicle V can recognize the existence of the following vehicle V3.

Similarly to the first embodiment, the image output section 14 is configured to sequentially send the image data of the display image that has been generated by the display image generating section 13 and stored in the output image frame memory 24 to the display device 4. As a result, when a following vehicle is not close behind the host vehicle V, a display image obtained by enlarging an image of a region rearward of the host vehicle V (the region B1) to an image size equivalent to a mirror reflection image of the rearview mirror RM is displayed on the display device 4 as shown, for example, in FIG. 7. On the other hand, when a following vehicle is traveling close behind the host vehicle V such that a blind spot region exists laterally of the following vehicle, a wide area image encompassing a region rearward of the host vehicle V (the region B1) and regions laterally rearward of the host vehicle V (the regions B2 and B3) is displayed on the display device 4 as shown in, for example, FIG. 19. The display image shown in FIG. 19 exemplifies an image that would be displayed on the display device 4 during the traffic situation shown in FIG. 18. Based on the display image shown in FIG. 19, the driver of the host vehicle V can recognize the existence of the other following vehicle V3 located laterally (to the side) of the following vehicle V2 traveling close behind the host vehicle V.

As described in detail above based the second embodiment, the vehicle periphery monitoring apparatus is configured and arranged to display an enlarged image of a region rearward of the host vehicle V (the region B1) on the display device 4 when a following vehicle is not traveling close behind the host vehicle V such that the driver of the host vehicle V can perceive a distance correctly based on the rearward image. On the other hand, the vehicle periphery monitoring apparatus according to the second embodiment is configured and arranged to display a wide area image of regions rearward and laterally rearward of the host vehicle V on the display device 4 when a following vehicle is traveling close behind the host vehicle V such that a blind spot region exists laterally of the following vehicle. Thus, important information regarding a blind spot region resulting from the close proximity of the following vehicle can be presented to the driver of the host vehicle V.

The first and second embodiments presented above are merely examples of applications of the present invention and the content of the embodiments is not intended to limit the technical scope of the invention. In other words, the technical scope of the present invention is not limited to the specific technical aspects disclosed in the embodiments and a variety of variations, modifications, and alternative technologies can be readily derived from the disclosures of the embodiments.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle periphery monitoring apparatus. Accordingly, these terms, as utilized to describe the present invention should be interpreted relative to a vehicle equipped with the vehicle periphery monitoring apparatus. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle periphery monitoring apparatus comprising:
    an image capturing device configured and arranged to capture an image of a region rearward of a host vehicle equipped with the vehicle periphery monitoring apparatus and an image of a region laterally rearward of the host vehicle;
    a display device mounted in an interior of the host vehicle;
    a blind spot determining section configured and arranged to determine that a following vehicle created blind spot region exists in the region laterally rearward of the host vehicle upon detecting a parameter indicative of a following vehicle blocking an area of the region laterally rearward of the host vehicle; and
    a processing section configured to switch a displayed image on the display device from a first display image to a second display image in response to the blind spot determining section determining that the following vehicle created blind spot region exists, the first display image including the image of the region rearward of the host vehicle, and the second display image including at least a portion of the image of the region laterally rearward of the host vehicle that encompasses the following vehicle created blind spot region which is absent from the first display image.

2. The vehicle periphery monitoring apparatus recited in claim 1, wherein
    the image capturing device includes
        a first image capturing section configured and arranged to capture a first image including the image of the region rearward of the host vehicle and the region laterally rearward of the host vehicle, and
        a second image capturing section configured and arranged to capture a second image including the image of the region laterally rearward of the host vehicle from a different viewpoint than the first image capturing section.

3. The vehicle periphery monitoring apparatus recited in claim 2, wherein
    the processing section is configured to generate the first display image using the first image captured by the first image capturing section, and to generate the second display image by combining at least a portion of the second image including the following vehicle created blind spot region captured by the second image capturing section with the first image captured by the first image capturing section.

4. The vehicle periphery monitoring apparatus recited in claim 3, wherein
    the processing section is configured to generate the second display image by superimposing at least a portion of the second image including the following vehicle created blind spot region captured by the second image capturing section onto the first image captured by the first image capturing section.

5. The vehicle periphery monitoring apparatus recited in claim 3, wherein
    the processing section is configured to generate the second display image by arranging at least a portion of the second image including the following vehicle created blind spot region captured by the second image capturing section alongside the first image captured by the first image capturing section.

6. The vehicle periphery monitoring apparatus recited in claim 1, wherein
    the blind spot determining section is configured to determine that the following vehicle created blind spot region exists when a distance between the host vehicle and the following vehicle exceeds a prescribed threshold value.

7. The vehicle periphery monitoring apparatus recited in claim 2, wherein
    the blind spot determining section is configured to determine that the following vehicle created blind spot exists by processing the first image.

8. The vehicle periphery monitoring apparatus recited in claim 6, further comprising
    a following vehicle detecting device configured and arranged to detect the following vehicle traveling behind the host vehicle,
    the blind spot determining section being configured to determine that the following vehicle created blind spot region exists based on a detection result by the following vehicle detecting device.

9. The vehicle periphery monitoring apparatus recited in claim 1, further comprising
    an obstacle detecting device configured and arranged to detect whether an obstacle exists between the host vehicle and the following vehicle,
    the processing section being configured to superimpose an indicia indicative of the obstacle detected by the obstacle detecting device on the second display image.

10. The vehicle periphery monitoring apparatus recited in claim 1, wherein
    the image capturing device includes a single camera configured and arranged to produce both the first and second display images.

11. The vehicle periphery monitoring apparatus recited in claim 10, wherein
    the processing section is configured to generate the first display image by enlarging the image of the region rearward of the host vehicle captured by the image capturing device.

12. The vehicle periphery monitoring apparatus recited in claim 1, wherein
    the image capturing device further includes a third image capturing section configured and arranged to capture a third image including an image of a region laterally rearward of the vehicle disposed on an opposite side from the region laterally rearward of the vehicle encompassed in the second image with respect to the region rearward of the vehicle in the first image, and
    the processing section is configured to generate the second display image by combining at least portions of the second and third images including the following vehicle created blind spot region captured by the second and third image capturing sections with the first image captured by the first image capturing section.

13. The vehicle periphery monitoring apparatus recited in claim 12, wherein the image capturing device includes a single camera configured and arranged to produce both the first and second display images.

14. The vehicle periphery monitoring apparatus recited in claim 1, wherein the image capturing device is configured and arranged to sequentially capture the image of the region rearward of the host vehicle and the image of a region laterally rearward of the host vehicle, and the processing section is configured to sequentially output one of the first and second display images to form a plurality of frames of a video sequence displayed on the display device.

15. A vehicle periphery monitoring apparatus comprising:

image capturing means for capturing an image of a region rearward of a host vehicle equipped with the vehicle periphery monitoring apparatus and an image of a region laterally rearward of the host vehicle;

display means for displaying the images captured by the image capturing means;

blind spot determining means for determining that a following vehicle created blind spot region exists in the region laterally rearward of the host vehicle upon detecting a parameter indicative of a following vehicle blocking an area of the region laterally rearward of the host vehicle; and processing means for switching a display image displayed on the display means from a first display image to a second display image in response to the blind spot determining means determining that the following vehicle created blind spot region exists, the first display image including the image of the region rearward of the host vehicle, and the second display image including at least a portion of the image of the region laterally rearward of the host vehicle that encompasses the following vehicle created blind spot region which is absent from the first display image.

16. A vehicle periphery monitoring method comprising:

capturing an image of a region rearward of a host vehicle equipped with the vehicle periphery monitoring apparatus and an image of a region laterally rearward of the host vehicle;

determining that a following vehicle created blind spot region exists in the region laterally rearward of the host vehicle upon detecting a parameter indicative of a following vehicle blocking an area of the region laterally rearward of the host vehicle; and switching a display image displayed on a display device from a first display image to a second display image in response to determining that the following vehicle created blind spot region, the first display image including the image of the region rearward of the host vehicle, and the second display image including at least a portion of the image of the region laterally rearward of the host vehicle that encompasses the following vehicle created blind spot region which is absent from the first display image.

* * * * *